United States Patent
Yao et al.

(10) Patent No.: US 11,371,821 B2
(45) Date of Patent: Jun. 28, 2022

(54) METHOD FOR EXTRACTING GEAR TOOTH PROFILE EDGE BASED ON ENGAGEMENT-PIXEL IMAGE EDGE TRACKING METHOD

(71) Applicant: Xiamen University, Xiamen (CN)

(72) Inventors: Bin Yao, Xiamen (CN); Zhiqin Cai, Xiamen (CN); Binqiang Chen, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 903 days.

(21) Appl. No.: 16/183,737

(22) Filed: Nov. 8, 2018

(65) Prior Publication Data

US 2019/0285396 A1    Sep. 19, 2019

(30) Foreign Application Priority Data

Mar. 16, 2018    (CN) .......................... 201810219776.0

(51) Int. Cl.
*G01B 5/20*    (2006.01)
*G06T 7/13*    (2017.01)
(Continued)

(52) U.S. Cl.
CPC ............ *G01B 5/202* (2013.01); *G06T 7/0006* (2013.01); *G06T 7/13* (2017.01); *B23F 21/06* (2013.01);
(Continued)

(58) Field of Classification Search
USPC ... 33/501.8, 501.7, 501.11, 501.14, 546, 547
See application file for complete search history.

(56) References Cited

U.S. PATENT DOCUMENTS 3,400,463 A * 9/1968 Barringer .................. G01B 7/34
33/554
3,936,946 A * 2/1976 Ruffner .................. G01B 7/146
33/501.14

(Continued)

FOREIGN PATENT DOCUMENTS

DE    202019103527 U1 * 11/2020
GB         2203548 A * 10/1988  ............. G01B 7/146

OTHER PUBLICATIONS

Xutang Wu. "Principle of Gear Engagement". Xi'an: Xi'an JiaoTong University Press, 2nd, 2009.
(Continued)

*Primary Examiner* — Christopher W Fulton
(74) *Attorney, Agent, or Firm* — Bayramoglu Law Offices LLC

(57) ABSTRACT

A method for extracting a gear tooth profile edge based on an engagement-pixel image edge tracking method includes defining a transmission ratio relationship between a cutter and an envelope tooth profile, setting a cutter profile step size and an envelope step size, acquiring instantaneous contact images at different engaging times, and performing a binarization processing on each curve envelope cluster image; sweeping a boundary of an envelope curve cluster, acquiring pixel points of the edge; preliminarily tracking a tooth profile edge, and then performing a secondary extraction and compensation on the pixel points; calibrating coordinates of a cutter profile; extracting a pixel coordinate of an instantaneous engaging point; converting the pixel points among different instantaneous engaging images; extracting a final tooth profile coordinate of the gear, and performing a tooth shape error analysis and a contact line error analysis.

5 Claims, 5 Drawing Sheets

(51) Int. Cl.
*G06T 7/00* (2017.01)
*B23F 21/06* (2006.01)
*B23F 23/12* (2006.01)
*G01B 7/14* (2006.01)

(52) U.S. Cl.
CPC .......... *B23F 23/1218* (2013.01); *G01B 7/146* (2013.01); *G05B 2219/35022* (2013.01); *G06T 2207/30164* (2013.01); *Y10T 409/101431* (2015.01)

(56) References Cited

U.S. PATENT DOCUMENTS

| | | | | |
|---|---|---|---|---|
| 4,062,125 A * | 12/1977 | Maag | ............... | G01B 5/202 33/501.14 |
| 4,166,323 A * | 9/1979 | Maag | ............... | G01B 7/008 33/551 |
| 4,285,133 A * | 8/1981 | Sterki | ............... | G01B 21/20 33/1 M |
| 4,565,474 A * | 1/1986 | Charles | ............... | B23F 17/001 451/147 |
| 4,852,402 A * | 8/1989 | Bertz | ............... | G01B 7/283 33/561 |
| 5,164,579 A * | 11/1992 | Pryor | ............... | G01S 17/87 356/3.07 |
| 5,287,293 A * | 2/1994 | Chen | ............... | G06T 7/0006 382/152 |
| 5,505,003 A * | 4/1996 | Evans | ............... | G01B 5/20 33/501.7 |
| 5,610,994 A * | 3/1997 | Stadtfeld | ............... | G06T 7/0004 382/152 |
| 6,047,479 A * | 4/2000 | Galestien | ............... | G01B 7/284 33/553 |
| 11,268,800 B2 * | 3/2022 | Van Hauth | ............... | B23F 23/12 |

OTHER PUBLICATIONS

Spitas V, Costopoulos T, Spitas C. "Fast modeling of conjugate gear tooth profiles using discrete presentation by involute segments". Mechanism and machine theory, 2007, 42(6): 751-762.

F. Litvin, Y.Zhang, J.C.Wang. et al. "Design and geometry of face-gear drive". ASME, Journal of Mechanical Design,1992,114:642-647.

F .Litvin, A.Funentes. "Gear geometry and applied theory". Cambridge: Cambridge University Press, 2004.

D. C. H. Yang, S.H. Tong, J.Lin. "Deviation function based pitch curves modification for conjugate pair design". ASME Journal Mechanical Design, 1999, 121 (4):579-585.

Q.Fan. "Optimization of Face Cone Element for Spiral Bevel and Hypoid Gears", ASME 2011 International Design Engineering Technical Conferences and Computers and Information in Engineering Conference. 2011:189-195.

Ziping Fu. "Research on Machining Simulation of Gear Shaping and Gear Grinding Principle of Orthogonal Face Gears". Nanjing: Nanjing University of Aeronautics and Astronautics, 2006.

Chao Lin, Shasha Li, Hai Gong. "Design and 3D Modeling of Orthogonal Variable Transmission Ratio Face Gear". Journal of Hunan University (Natural Sciences), 2014, 41(3):49-55.

Shen Z, Yao B, Teng W, et al. "Generating grinding profile between screw rotor and forming tool by digital graphic scanning (DGS) method". International Journal of Precision Engineering & Manufacturing, 2016, 17(1 ):35-41.

* cited by examiner

US 11,371,821 B2

METHOD FOR EXTRACTING GEAR TOOTH PROFILE EDGE BASED ON ENGAGEMENT-PIXEL IMAGE EDGE TRACKING METHOD

CROSS REFERENCE TO RELATED APPLICATIONS

This application is based upon and claims priority to Chinese Patent Application No. CN201810219776.0, filed on Mar. 16, 2018, the entire contents of which are incorporated herein by reference.

TECHNICAL FIELD

The present invention relates to the gears, and in particular to a method for extracting a gear tooth profile edge based on engagement-pixel image edge tracking method.

BACKGROUND

With the extensive application of gears, the tooth profile also become increasingly complicated. For example, beveloid gears, non-circular gears, and compressor screw rotors, etc. Accordingly, it is of great importance to know how to design and simulate the precise tooth profile after cutting in a fast and simple way.

In the aspect of researching and designing the tooth surface of a complex curved surface, XuTang WU summarized and proposed two methods for calculating the conjugate surface of the engaging motion and the calculation process thereof[1], namely, an envelope analysis and tooth profile normal method. Spitas introduced a method for determining the conjugate tooth profile by dispersing the gear tooth surface into a plurality of involute line segments[2]. F. L. Litvin et al. systematically researched the gear geometry in combination of the basic theory of conjugate curved surface[3-6]. However, the model established according to the theory of conjugate curved surface has two problems in the solution process. In the first aspect, the solution of the engagement equation of complex tooth surface is complicated. In the second aspect, the undercutting or double enveloping will cause the phenomenon of numerical instability around the singularity. Consequently, some new methods are proposed for obtaining the accurate tooth profile without using the traditional complex engagement equation of the tooth surface. For example: 1) the three-dimensional modeling of complex surfaces is completed by means of Boolean operations in CAD/CAE software. ZiPing Fu et al. realized the computer simulation of machining motion of gear shaping of the orthogonal face gear by means of the secondary development of VB and AutoCAD[7]. Chao Lin et al. analyzed the moving track of the cutter during machining, and developed a parametric design method and simulation processing system for the gear pair with the variable transmission ratio between the intersecting axes by means of the virtual simulation technique and the software technique[8]. With high accuracy and stability, such method has great application prospects. But, the method has a low calculation efficiency because it is based on the three-dimensional Boolean operation. 2) The conventional calculation method of conjugation is replaced and the envelope boundary is extracted in some special manners by simulating the machining process for forming the conjugate curved surfaces such as gear pairs etc. Zhi-Huang Shen established the swept surface model formed by the conjugate motion between the screw rotor and the formed grinding wheel based on the enveloping theory, and extracted the image profile data by means of the computer graphics theory[9]. The method can acquire profile data of the image fast. However, there is a relatively large theoretical error between the tracked pixel point and the theoretical curve because the accuracy of the image edge depends on the planning of the tracking path, the amount of pixel points, and the fitting accuracy of the curves.

CITED REFERENCES

[1] Xutang Wu. Principle of Gear Engagement [M]. Xi'an: Xi'an JiaoTong University Press, 2nd, 2009.
[2] Spitas V, Costopoulos T, Spitas C. Fast modeling of conjugate gear tooth profiles using discrete presentation by involute segments[J]. Mechanism and machine theory, 2007, 42(6): 751-762.
[3] F. Litvin, YZhang, J. C. Wang. Design and geometry of face-gear drive [J].ASME, Journal of Mechanical Design, 1992, 114:642-647.
[4] F. Litvin, A. Fuentes. Gear geometry and applied theory [M]. Cambridge: Cambridge University Press, 2004.
[5] D. H. Yang, S. H. Tong, J. Lin. Deviation function based pitch curves modification for conjugate pair design [J]. ASME Journal Mechanical Design, 1999, 121 (4):579-585.
[6] Q.Fan. Optimization of Face Cone Element for Spiral Bevel and Hypoid Gears[C]//ASME 2011 International Design Engineering Technical Conferences and Computers and Information in Engineering Conference. 2011: 189-195.
[7] Ziping Fu. Research on Machining Simulation of Gear Shaping and Gear Grinding Principle of Orthogonal Face Gears [D].Nanjing: Nanjing University of Aeronautics and Astronautics, 2006.
[8] Chao Lin, ShaSha Li, Hai Gong. Design and 3D Modeling of Orthogonal Face Gear with Variable Transmission Ratio [J]. Journal of Hunan University (Natural Sciences), 2014, 41(3):49-55.
[9] Shen Z, Yao B, Teng W, et al. Generating grinding profile between screw rotor and forming tool by digital graphic scanning (DGS) method[J]. International Journal of Precision Engineering & Manufacturing, 2016, 17(1):35-41.

SUMMARY

The objective of the present invention is to provide a method for extracting a gear tooth profile edge based on the engagement-pixel image edge tracking method to design and simulate an accurate profile of any complex conjugate curved surface after machining, in a fast and simple manner.

The present invention includes the following steps:
1) defining a transmission ratio relationship between a cutter and an envelope tooth profile, setting a cutter profile step size and an envelope step size, acquiring instantaneous contact images at different engaging times, and performing a binarization processing on each curve envelope cluster image;
2) sweeping a boundary of an envelope curve cluster, acquiring pixel points of the edge; wherein in order to meet a stability requirement during a gear transmission process, a gear tooth profile is a smooth tooth profile with a regular curvature variation; preliminarily tracking the tooth profile edge by means of a traditional edge tracking method (reptile method), and then performing a secondary extraction and compensation on the pixel points to improve the accuracy of the tooth profile in combination of two main features, namely, a feature of a step-shaped tooth profile pixel edge and a feature of a pixel absence in a position with a small curvature variation between adjacent tooth profiles;

3) calibrating the coordinate of the cutter profile;

wherein, in step 3), the specific method for calibrating the coordinates of the cutter profile includes: converting a theoretical value of the cutter into a coordinate value of a pixel to meet the requirements of subsequent processing since coordinate values change between the curve envelope cluster image obtained by simulating a forming machining process of a gear conjugate surface and an image obtained by a binarization;

4) extracting the pixel coordinates of an instantaneous engaging point;

in step 4), the specific method for extracting the pixel coordinates of the instantaneous engaging point includes: taking the pixel coordinate of the cutter as a basis; combining an engaging point between the cutter and the tooth profile during each instantaneous engaging process; and obtaining the pixel coordinate of an instantaneous contacting point;

5) converting the pixel points among different instantaneous engaging images;

in step 5), the specific method for converting the pixel points among different instantaneous engaging images includes: performing a corresponding coordinate transformation on an engaging pixel point obtained at each instant, since each instant corresponds to different pixel images;

6) extracting a final tooth profile coordinate and an edge tooth profile of the gear according to the coordinate transformation process of steps 1) to 5), and performing a tooth shape error analysis and a contact line error analysis.

In the present invention, an envelope curve cluster of any tooth profile is acquired on a mathematical software and the envelope curve cluster is converted into a binary image by defining a cutter (which can be a cylindrical gear or a hob, etc.) and a cutter moving path. Based on two main principles, the accurate discrete data points of the instantaneous contact points are obtained in the end, and a precise tooth shape of the gear is generated. The two main principles include: the cutter and the gear tooth profile have only one engaging point at each engaging moment; and the position of minimal normal displacement between the pixel point of the image edge and the calibration cutter is the engaging point. The present invention can be used to design and simulate the accurate profile of any complex conjugate curved surface after machining, in a simple and fast manner.

The present invention proposes a new method for extracting gear tooth profile edge (i.e. engagement-pixel image edge tracking method). The method is based on simulating the conjugate forming machining process of the gear pair, and combines the relevant theory of image edge pixel extraction in computer graphics. Taking the face gear, which is a complex conjugate curved surface, as an example, the generation principle of the tooth surface of the face gear is described, and the forming machining process is simulated. Combined with the engagement-pixel image edge tracking method, the edge tooth profile of the face gear is extracted, and the tooth shape error and the contact line error are judged, which verifies the accuracy and stability of the method.

DETAILED DESCRIPTION OF THE EMBODIMENTS

The present invention takes the face gear which has complex conjugate curved surface as an example for verification and analysis, and the specific steps are as follows.

1. According to the moving track of a hob cutter and the relevant machining parameters, the instantaneous engaging envelope images at different engaging times are obtained, and the binarization is performed, wherein the instantaneous tooth profile equation of the hob cutter is as follows:

$$r_{1'}(\theta_1) = [x_{1'}, y_{1'}, z_{1'}] = \begin{bmatrix} (h-R)\sin\theta_1 + (R\sin\theta_1 - w)\cos\theta_1, \dots \\ (R-h)\cos\theta_1 + (R\sin\theta_1 - w)\sin\theta_1, u_1 \end{bmatrix}; \quad (1)$$

the instantaneous envelope equation of face gear is as follows:

$$r_{2'}(\theta_1) = [x_{2'}, y_{2'}, z_{2'}] = \begin{bmatrix} (x_1\cos\phi_g - z_1\sin\phi_g)\cos\theta_2 - y_1\sin\theta_2, \dots \\ (x_1\cos\phi_g - z_1\sin\phi_g)\sin\theta_2 + y_1\cos\theta_2, \dots \\ -x_1\sin\phi_g - z_1\cos\phi_g \end{bmatrix}; \quad (2)$$

in the equations, $[x_1, y_1, z_1] = [x_{1'}(\phi s), y_{1'}(\phi_s), z_{1'}(\phi_s)]$; $\theta_1$ is the engaging angle at different engaging moments; $\theta_2 = \theta_1 / m_{gs}$, $m_{gs}$ is the transmission ratio of the face gear pair; $\theta_s$ is the envelope angle of the hob cutter, $\phi_g = \phi_s / m_{gs}$; wherein h and w are the x-coordinate and the y-coordinate of the cutter respectively; and R is the radius of the pitch circle of the cylindrical gear.

2. Regarding the image edge tracking, the gear tooth profiles are all smooth tooth profiles with regular curvature variation. The edge racking of this type of profile is relatively simple. Consequently, in the present invention, the pixel of the tooth profile edge is preliminarily extracted by the traditional edge tracking method i.e. reptile method. The pixel point of the gear tooth profile edge has the following two features.

Figure 1:
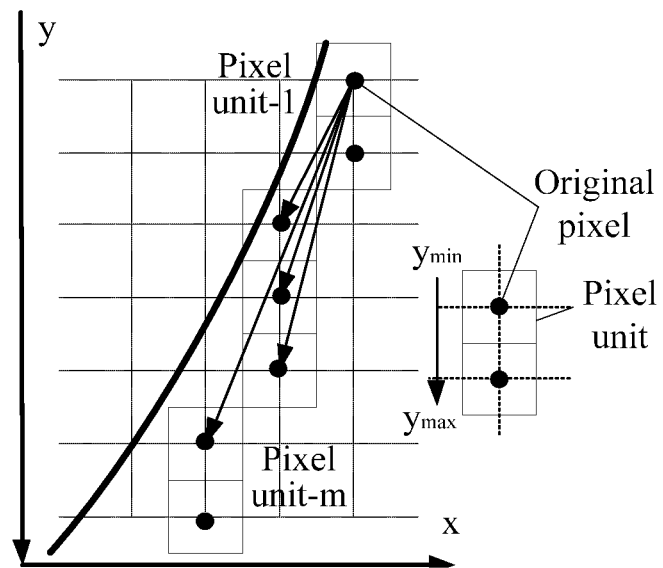
FIG. 1 shows the distribution rule of the pixel points of the tooth profile edge of a face gear.
Figure 2:
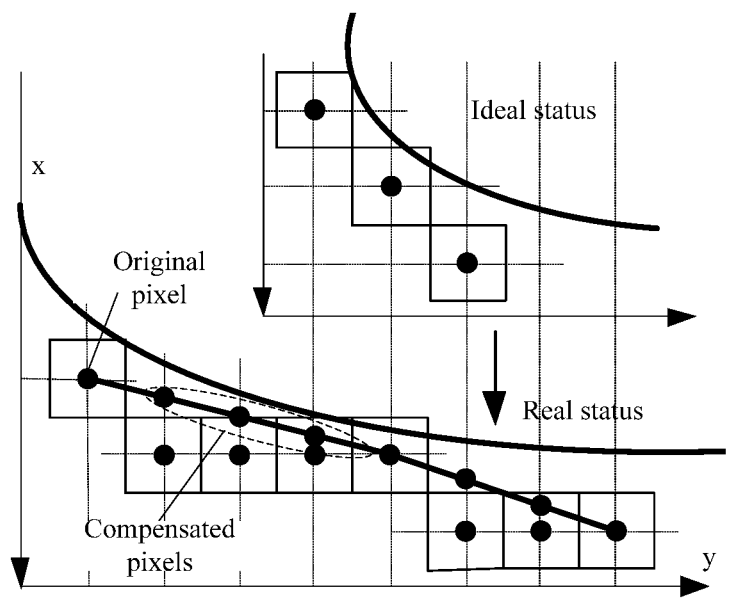
FIG. 2 shows the compensated pixel points of the tooth profile edge of a face gear.

① Due to the feature of step-shaped tooth profile pixel edge, the position of the theoretical tooth profile cannot be accurately defined, as shown in FIG. 2. As can be seen from FIG. 2, in the n-th pixel unit (composed of one column of pixel points), the starting pixel point (the smallest coordinate value Y in the pixel unit, $Y_{min}$) is closer to the theoretical tooth profile than the terminal pixel point (the largest coordinate value Y in the pixel unit, $Y_{max}$), but a certain error still exists.

Assuming that the starting pixel point of the first pixel unit is the starting point, the coordinate of the starting point is set as $P_{11}(x_{11}, y_{11})$. The coordinate of the starting pixel point of the n-th pixel unit is $P_{ni}(x_{ni}, y_{ni})$, wherein n=1, 2 . . . ; i is the pixel point, i=1, 2 . . . ; when i=1, it is the starting pixel point of the n-th pixel unit. The slope between the pixel point $P_{11}$ and any pixel point in the n-th pixel unit can be defined as below:

$$k_{ni} = \arctan\left(\frac{y_{ni} - y_{11}}{x_{11} - x_{ni}}\right); \quad (3)$$

the position with a maximum slope in each pixel unit is expressed below:

$$\max(k_{ni}) = [k_{21}, k_{31} \ldots k_{n1}] \quad (4);$$

then the pixel point corresponding to the position with the maximum slope is the starting pixel point in each pixel unit:

$$[P_{21}, P_{31} \ldots P_{n1}] = \text{location}(\max(k_{ni})) \quad (5).$$

② Regarding some of the positions of the tooth profile edge, since adjacent tooth profiles have relatively small variations in curvature, in the process of image binarization, there will be a distribution rule of pixel points as shown in FIG. 2, namely, each column (Y-axis direction) of the image has a plurality of pixel coordinates. In this case, if merely the starting point of the pixels is taken as the extracted pixel point, some pixel points will be missed and the accuracy of the tooth profile will be adversely affected. In order to increase the amount of pixel points in the edge and improve the accuracy of the tooth profile, in the case where the starting point of pixels of each pixel unit is determined, a spline interpolation function is established. In the spline interpolation function, value y of the pixel points is taken as an independent variable, so that different coordinate values x of the pixel points can be obtained and taken as compensated pixel points to increase the amount of pixel points.

Assuming that the coordinate of the starting point of an ideal straight line (i.e. the starting pixel point of the n-th pixel unit) is $P_{n1}(x_{n1}, y_{n1})$, and the coordinate of the terminal point (i.e. the starting pixel point of the (n+1)-th pixel unit) is $P_{(n+1)1}(x_{(n+1)1}, y_{(n+1)1})$, the equation of an implicit function of the straight line is as follows:

$$f(x, y) = y - \frac{y_{(n+1)} - y_{n1}}{x_{n1} - x_{(n+1)1}} x - b = 0; \quad (6)$$

wherein the value of b can be solved when $P_{n1}(x_{n1}, y_{n1})$ is substituted into the equation. The compensation principle of the amount of the compensated pixel points between the two adjacent starting pixel points is as follows. Assuming that $$D_n = |y_{(n+1)1} - y_{n1}| \quad (7),$$

the amount of compensated pixel points between the adjacent starting pixel points is $D_n - 1$. For the coordinate of the compensated pixel point, the corresponding $x_{ni}$ can be obtained by substituting $y_{n1} + 1, y_{n1} + 2 \ldots, y_{n1} + D_n - 1$ into equation (8):

$$X_{ni} = \left(\sum_{p=1}^{D_n - 1} \Sigma(y_{n1} + p) - b\right) \cdot \frac{x_{n1} - x_{(n+1)1}}{y_{(n+1)1} - y_{n1}}. \quad (8)$$

3. The techniques involved in the process of calibrating the coordinate of the cutter profile mainly include:

① the proportional scaling and translation transformation between the theoretical coordinate and the pixel coordinate; the coordinate transformation matrix is as follows:

$$M_1 = \begin{bmatrix} Dx & 0 & \Delta x \\ 0 & Dy & \Delta y \\ 0 & 0 & 1 \end{bmatrix}; \quad (9)$$

wherein, Dx and Dy are the magnification ratios the coordinates; $\Delta x$ and $\Delta y$ are the displacements of movement;

② the spline interpolation of the transformed pixel coordinates, namely, the value X of the pixel coordinate of the cutter is taken as an independent variable with a step size having a predetermined interval to perform a spline interpolation on value Y of the pixel coordinate of the cutter profile.

Figure 3:
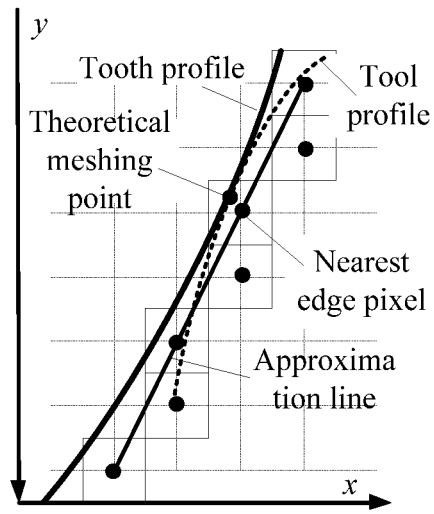
FIG. 3 shows the relationship between the instantaneous engaging points and the pixel points.

4. Since there is only one engaging point at each engaging moment when the cutter is engaged with the gear tooth profile (the left and right tooth profiles each have one engaging point), the instantaneous engaging point of the cutter and the gear tooth profile is the coordinate coincidence point. In the pixel image, as shown in FIG. 3, the coordinate coincidence point can be determined by the judgment rule that the coordinate values are equal to each other. However, there is an inevitable gap between the obtained coordinates of the edge pixel points and the calibrated coordinates of the cutter, so an approximation is required to eliminate this gap, i.e. the starting pixel point of each pixel unit and the compensated pixel point thereof are translated until they coincide with the coordinate value of the calibrated cutter. In this case, the coincidence point can be determined as the instantaneous engaging point. The basis for the determination is that, as can be seen from FIG. 3, the position of the minimal normal displacement between the pixel point of the image edge and the calibrated cutter is the engaging point. There are two main approximation paths from the edge pixel point to the engaging point.

Figure 4:
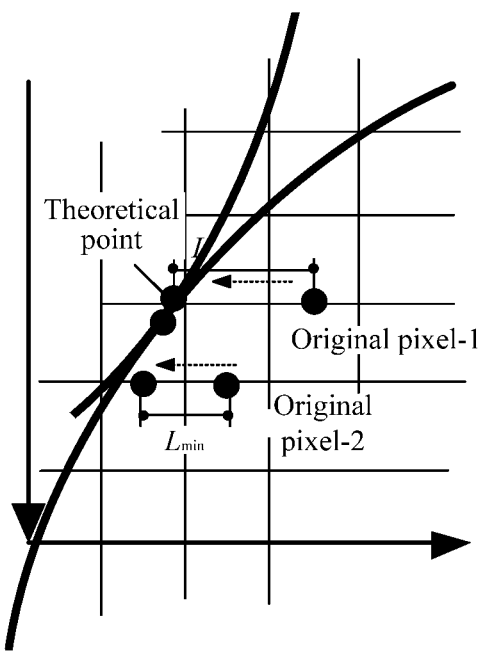
FIG. 4 shows that the tracking planning the pixel points horizontally approach.

① Horizontal approximation along the x-axis. The X-coordinate step size of the calibrated cutter is defined, and the corresponding interpolation Y is obtained. Then, the interpolation Y is rounded to an integer to obtain the coordinate of the cutter in pixel coordinates. The initial pixel point L is horizontally translated until the nearest initial pixel point coincides with the pixel coordinate of the cutter (i.e. the position of minimal displacement $L_{min}$), and this point is the instantaneous engaging point, as shown in FIG. 4.

Figure 5:
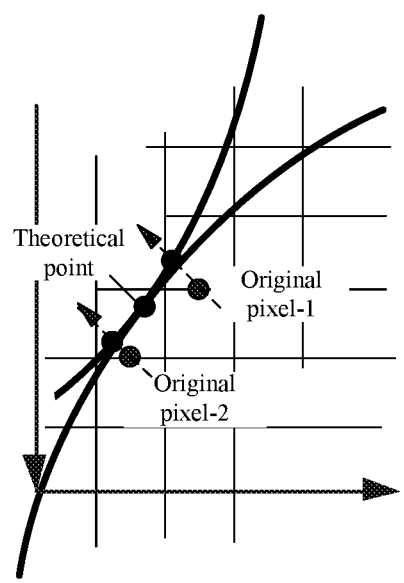
FIG. 5 shows that the tracking planning the pixel points approach in the normal direction.

② Approximation along the normal direction. The X-coordinate step size of the calibrated cutter is defined, and the corresponding interpolation coordinate Y is calculated to obtain the coordinate of the cutter in pixel coordinates. The image edge pixel points are translated along the normal direction until the nearest pixel point coincides with the pixel coordinate of the cutter, and this point is the instantaneous engaging point, as shown in FIG. 5.

5. In the process of converting the pixel points among different instantaneous engaging images:

① when the transmission mode is a gear transmission between the intersecting axes, by extracting the displacement variation quantity of the node position in each instantaneous engaging image, the movement displacement of each instantaneous engaging image can be obtained and the transformation coordinate matrix is established; the transformation coordinate matrix is as below:

$$M_2 = \begin{bmatrix} 0 & 0 & \Delta x \\ 0 & 0 & 0 \\ 0 & 0 & 0 \end{bmatrix}; \quad (10)$$

② when the transmission mode is a gear transmission between the parallel axes, the angular displacement of each instantaneous engaging image can be obtained according to the rotation angle variation of the node position in each instantaneous engaging image, and the transformed coordinate matrix is obtained:

$$M_2 = \begin{bmatrix} \cos\theta_1 & -\sin\theta_1 & 0 \\ \sin\theta_1 & \cos\theta_1 & 0 \\ 0 & 0 & 1 \end{bmatrix}. \quad (11)$$

6. Assuming the theoretical coordinate of the cutter is P'(x, y) and the pixel coordinate of the engaging point is P(X, Y), the final pixel coordinate of the tooth profile edge can be obtained by the following equation:

$$\begin{bmatrix} X \\ Y \\ 1 \end{bmatrix} = \begin{bmatrix} Dx & 0 & \Delta x \\ 0 & Dy & \Delta y \\ 0 & 0 & 1 \end{bmatrix} \begin{bmatrix} x \\ y \\ 1 \end{bmatrix} + M_2 \quad (12)$$

Figure 6:
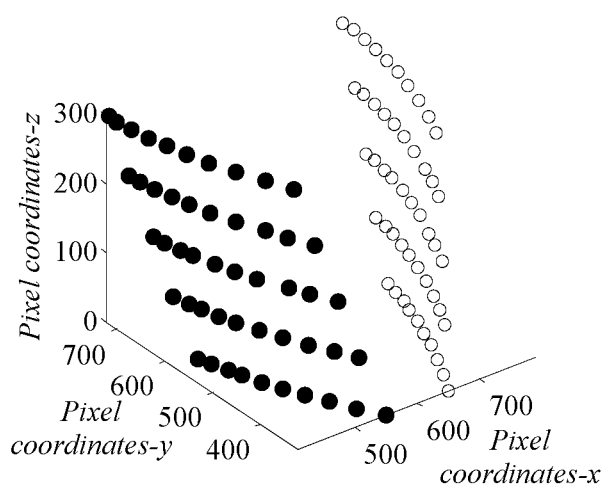
FIG. 6 shows the tooth surface of the face gear.
Figure 7:
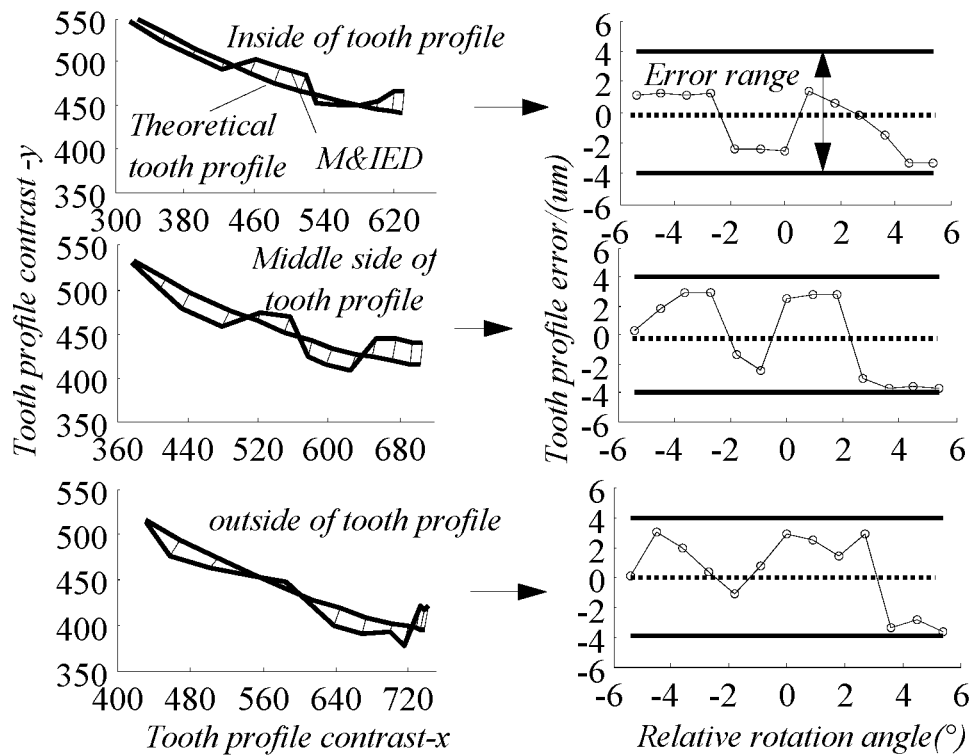
FIG. 7 shows the tooth profile error comparison of the face gear.
Figure 8:
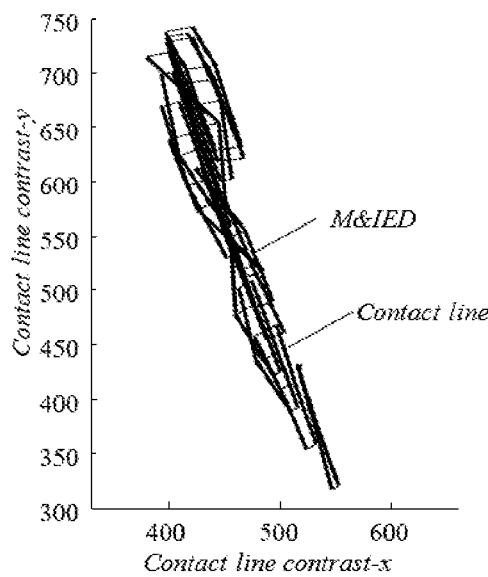
FIG. 8 shows the contact line comparison of the face gear.
Figure 9:
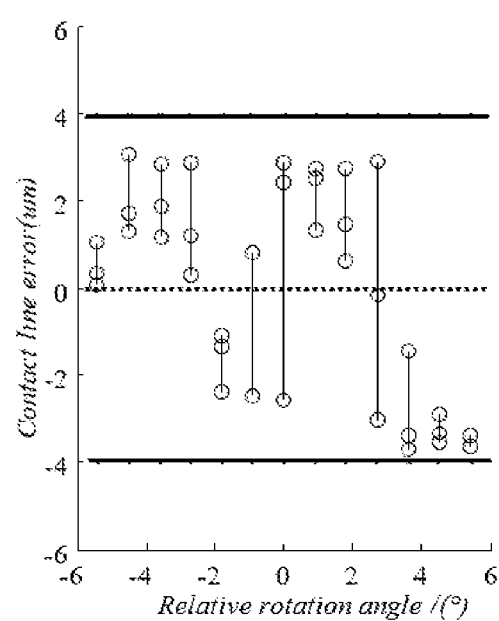
FIG. 9 shows the contact line error comparison of the face gear.

Taking the face gear as an example, the method provided by the present invention can be used to analyze the tooth profile of the face gear (as shown in FIG. 6), the tooth profile error of the face gear (as shown in FIG. 7), and the numerical solution of the contact track (as shown in FIG. 8) and the corresponding error thereof (as shown in FIG. 9). It is proved by the results that the accuracy is higher of the tooth profile of the face gear when obtained by the method provided by the present invention. So it can be used in an accurate solution of the tooth profile of the face gear. Accordingly, the present invention can be used as a powerful tool in the simulation and machining of the face gear and the accurate forming of the tooth surface.

The invention claimed is:

1. A method for extracting a gear tooth profile edge based on an engagement-pixel image edge tracking method, comprising the following steps:
   step (1): defining a transmission ratio relationship between a cutter and an envelope tooth profile, setting a cutter profile step size and an envelope step size, acquiring instantaneous contact images at different engaging times, and performing a binarization processing on each curve envelope cluster image;
   step (2): sweeping a boundary of an envelope curve cluster, acquiring pixel points of the edge; whereas in order to meet a stability requirement during a gear transmission process, a gear tooth profile is a smooth tooth profile with a regular curvature variation; preliminarily tracking a tooth profile edge by means of a traditional edge tracking method, and then performing a secondary extraction and compensation on the pixel points to improve an accuracy of the tooth profile in combination of two main features, namely, a feature of a step-shaped tooth profile pixel edge and a feature of a pixel absence in a position with a small curvature variation between adjacent tooth profiles;
   step (3): calibrating coordinates of a cutter profile;
   step (4): extracting a pixel coordinate of an instantaneous engaging point;
   step (5): converting the pixel points among different instantaneous engaging images;
   step (6): extracting a final tooth profile coordinate and the tooth profile edge of the gear according to a coordinate transformation process of steps (1) to (5), and performing a tooth shape error analysis and a contact line error analysis.

2. The method for extracting the gear tooth profile edge based on the engagement-pixel image edge tracking method according to claim 1, wherein in step (3), the step of calibrating the coordinates of the cutter profile includes: simulating a forming machining process of a gear conjugate surface to obtain an image of the envelope curve cluster; changing coordinate values between the image of the envelope curve cluster and an image obtained by a binaryzation; and converting a theoretical value of the cutter into a coordinate value of a pixel to meet a requirement of subsequent processing.

3. The method for extracting the gear tooth profile edge based on the engagement-pixel image edge tracking method according to claim 1, wherein in step (4), the step of extracting the pixel coordinate of the instantaneous engaging point includes: taking the pixel coordinate of the cutter as a basis; combining an engaging point between the cutter and the tooth profile during each instantaneous engaging process; and obtaining the pixel coordinate of the instantaneous engaging point.

4. The method for extracting the gear tooth profile edge based on the engagement-pixel image edge tracking method according to claim 1, wherein in step (5), the step of converting the pixel points among different instantaneous engaging images includes: performing a corresponding coordinate transformation on the pixel points among the different instantaneous engaging images, since each instant corresponds to the different instantaneous engaging pixel images.

5. The method for extracting the gear tooth profile edge based on the engagement-pixel image edge tracking method according to claim 1, wherein in step (6), the gear is a face gear.

* * * * *